United States Patent
Awad et al.

(10) Patent No.: US 10,287,184 B2
(45) Date of Patent: May 14, 2019

(54) WATER FILTRATION APPARATUS AND A METHOD OF USING THEREOF

(71) Applicant: University of Dammam, Dammam (SA)

(72) Inventors: Loay Awad, Al-Khobar (SA); Fawaz Ali Al Muaddi, Dammam (SA); Mohammed Abdullah Alamri, Al-Khobar (SA); Majed Mulfi Alotaibi, Dhahran (SA); Abdullah Mazyad Alotaibi, Dammam (SA); Badr Saleh Alzahrani, Dammam (SA); Talal Fahad Alotaebi, Dammam (SA)

(73) Assignee: University of Dammam, Dammam (SA)

( * ) Notice: Subject to any disclaimer, the term of this patent is extended or adjusted under 35 U.S.C. 154(b) by 276 days.

(21) Appl. No.: 15/352,643

(22) Filed: Nov. 16, 2016

(65) Prior Publication Data

US 2018/0134582 A1 May 17, 2018

(51) Int. Cl.
*C02F 1/28* (2006.01)
*C02F 1/42* (2006.01)
(Continued)

(52) U.S. Cl.
CPC ............. *C02F 1/288* (2013.01); *B01J 20/289* (2013.01); *B01J 20/3085* (2013.01);
(Continued)

(58) Field of Classification Search
CPC .......... C02F 1/288; C02F 1/002; C02F 1/004; C02F 1/281; C02F 1/283; C02F 1/285;
(Continued)

(56) References Cited

U.S. PATENT DOCUMENTS 4,969,995 A * 11/1990 Jackson ............... B01J 45/00
210/263
5,919,371 A 7/1999 Bauer
(Continued)

FOREIGN PATENT DOCUMENTS

CN 102430349 A 5/2012

OTHER PUBLICATIONS

Bailey, A review of potentially low-cost sorbents for heavy metals, Water Research, vol. 33, pp. 2469-2479. (Year: 1999).*
(Continued)

*Primary Examiner* — Matthew O Savage
(74) *Attorney, Agent, or Firm* — Oblon, McClelland, Maier & Neustadt, L.L.P.

(57) ABSTRACT

A water filtration apparatus and a method of using thereof, wherein the water filtration apparatus includes a nanoparticle layer which comprises polypeptide-functionalized nanoparticles that are capable of absorbing heavy metals selected from the group consisting of $Pb^{2+}$, $As^{5+}$, $Cd^{2+}$, $Hg^{2+}$, $Cr^{6+}$, $Cu^{2+}$, and $Zn^{2+}$, as well as organic materials. Various embodiments of the water filtration apparatus, the method of using the apparatus, and a method of producing the polypeptide-functionalized nanoparticles are also provided.

20 Claims, 8 Drawing Sheets

(51) Int. Cl.

| | | |
|---|---|---|
| *C02F 9/00* | (2006.01) | |
| *B01J 20/32* | (2006.01) | |
| *B01J 20/289* | (2006.01) | |
| *B01J 20/30* | (2006.01) | |
| *C02F 1/00* | (2006.01) | |
| C02F 101/22 | (2006.01) | |
| C02F 101/20 | (2006.01) | |
| C02F 101/10 | (2006.01) | |
| C02F 101/14 | (2006.01) | |
| C02F 101/30 | (2006.01) | |

(52) U.S. Cl.
CPC ........ *B01J 20/3202* (2013.01); *B01J 20/3219* (2013.01); *B01J 20/3274* (2013.01); *C02F 1/002* (2013.01); *C02F 1/004* (2013.01); *C02F 1/283* (2013.01); *C02F 9/00* (2013.01); C02F 1/281 (2013.01); C02F 1/285 (2013.01); C02F 2101/103 (2013.01); C02F 2101/14 (2013.01); C02F 2101/20 (2013.01); C02F 2101/22 (2013.01); C02F 2101/30 (2013.01); C02F 2201/006 (2013.01); C02F 2305/08 (2013.01); C02F 2307/02 (2013.01); Y02W 10/37 (2015.05)

(58) Field of Classification Search
CPC ........ C02F 9/00; C02F 9/005; C02F 2101/10; C02F 2101/14; C02F 2101/20; C02F 2101/22; C02F 2101/30; C02F 2101/103; C02F 2201/006; C02F 2305/08; C02F 2307/02; B01J 20/289; B01J 20/3085; B01J 20/3202; B01J 20/3219; B01J 20/3274
See application file for complete search history.

(56) References Cited

U.S. PATENT DOCUMENTS

| | | |
|---|---|---|
| 7,291,266 B2 | 11/2007 | Takashima et al. |
| 8,366,936 B1 | 2/2013 | Jones |
| 2007/0160599 A1* | 7/2007 | Acey ............... A61M 5/28 424/140.1 |
| 2008/0190855 A1* | 8/2008 | Compton ............. B01J 45/00 210/688 |
| 2011/0186496 A1* | 8/2011 | Pedersen ............. C02F 1/002 210/198.1 |
| 2011/0253634 A1* | 10/2011 | Soane ................ C02F 1/28 210/680 |

OTHER PUBLICATIONS

Mohan, Arsenic removal from water/wastewater using adsorbents—A review, Journal of Hazardous Materials, vol. 142, pp. 1-53 (Year: 2006).*

Wang, Amino-functionalized Fe3O4 at SiO2 core-shell magnetic nanomaterial as a novel adsorbent for aqueous heavy metals removed, Journal of Colloid and Interface Science, vol. 349, pp. 293-299. (Year: 2010).*

Zhou, A chelating dendritic ligand capped quantum dot: preparation, surface passivation, bioconjugation and specific DNA detection, Nanoscale, vol. 3, pp. 201-211. (Year: 2011).*

Mohan, Activated carbons and low cost adsorbents for remediation of tri- and hexavalent chromium from water, Journal of Hazardous Materials, vol. 137, pp. 762-811. (Year: 2006).*

Katarzyna Pawluk, et al., "Evaluation of single and multilayered reactive zones for heavy metals removal from stormwater", Environmental Technology, Dec. 2014, 1 page (Abstract only).

Xiang-feng Kong, et al., "Selective removal of heavy metal ions from aqueous solutions with surface functionalized silica nanoparticles by different functional groups", J. Cent. South Univ., vol. 21, 2014, pp. 3575-3579.

M. Padervand, et al., "Removal of toxic heavy metal ions from waste water by functionalized magnetic core-zeolitic shell nanocomposites as adsorbents", Environ. Sci. Pollut. Res. Int., vol. 20, No. 6, Jun. 2013, pp. 3900-3909.

* cited by examiner

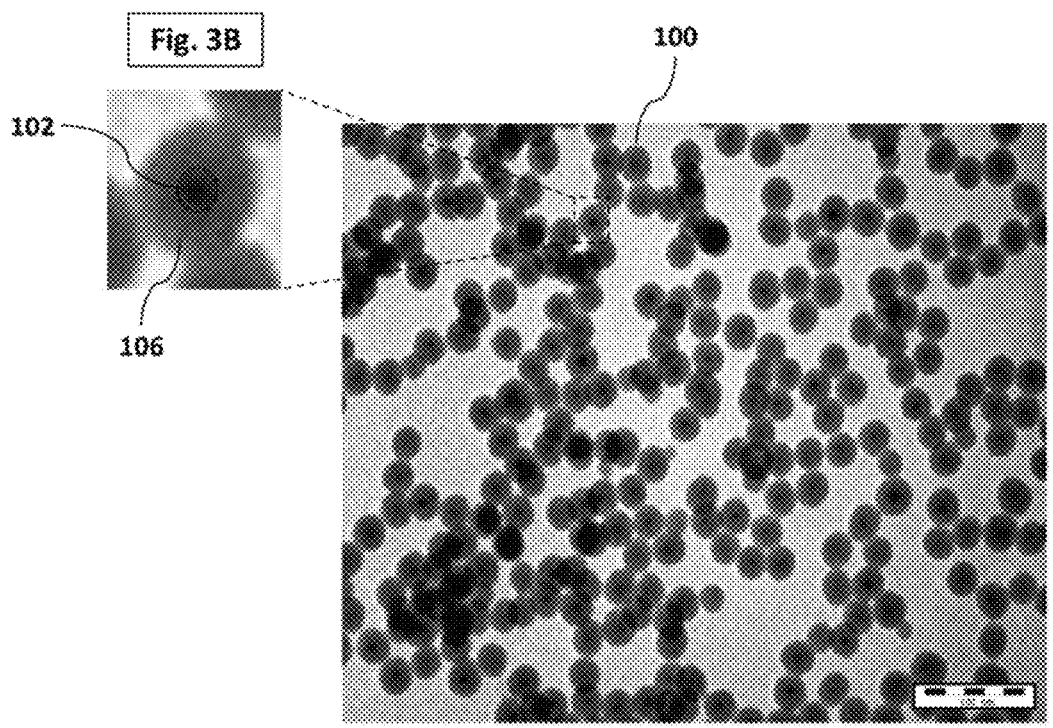

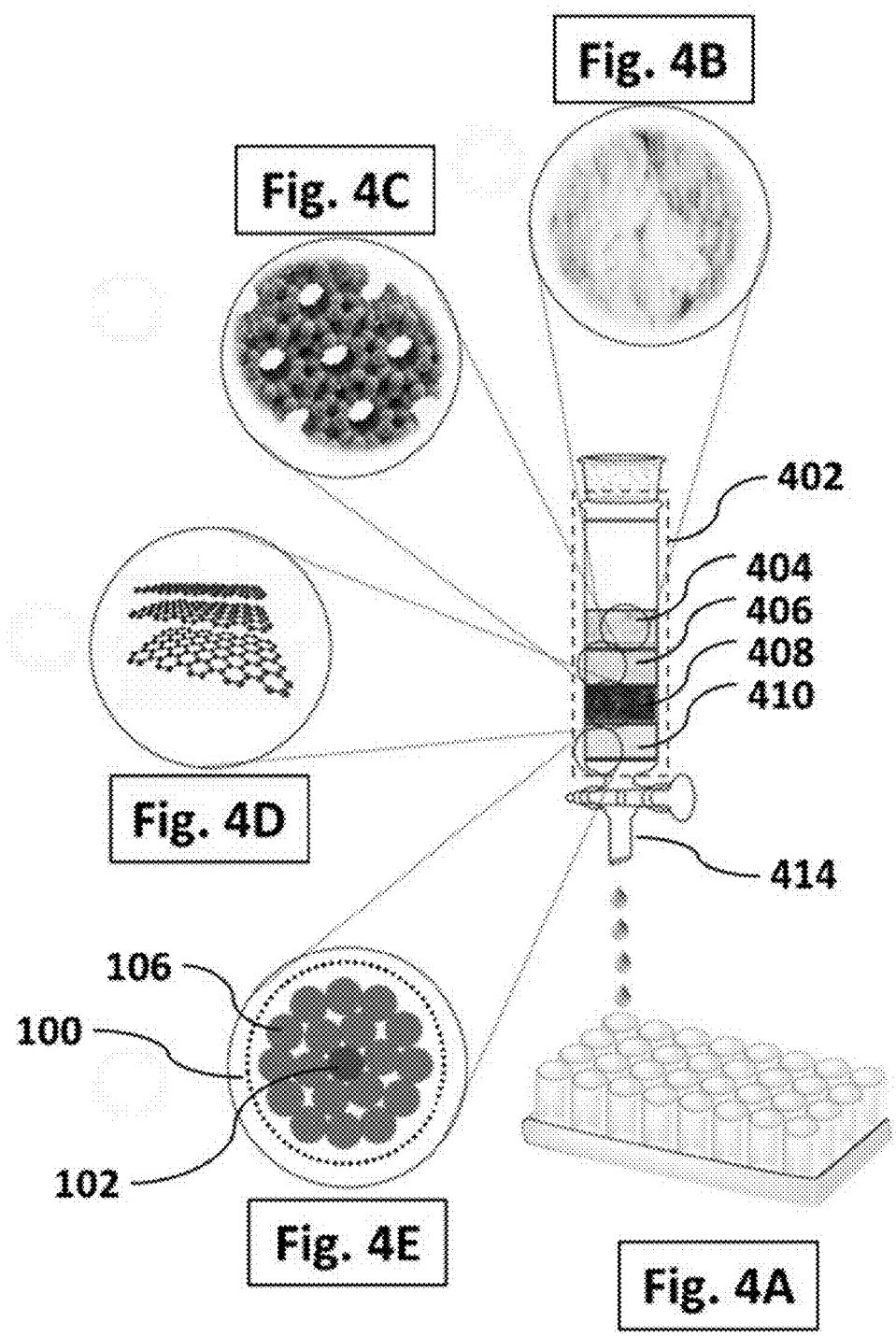

WATER FILTRATION APPARATUS AND A METHOD OF USING THEREOF

TECHNICAL FIELD

The present invention relates to a water filtration apparatus and a method of using the water filtration apparatus, wherein the water filtration apparatus includes a nanoparticle layer which comprises polypeptide-functionalized nanoparticles that are capable of absorbing heavy metals such as $Pb^{2+}$, $As^{5+}$, $Cd^{2+}$, $Hg^{2+}$, $Cr^{6+}$, $Cu^{2+}$, and $Zn^{2+}$, as well as organic materials.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over one billion people worldwide lack access to potable water. Water-borne diseases are one of the leading causes of disease and death in the world. Water systems in developing economies and emerging countries have shortcomings including operational complexity, operation and maintenance costs, expense, lack of portability, and the requirement of chemicals and energy to operate. Industries that locate operations in developing and emerging countries are seeking sustainable cost effective water supply systems to provide water to their facilities and the workers' communities. In developed economies, consumers are seeking a more environmentally sustainable life style which includes using alternative energy and fewer chemicals in products, including water. In dealing with water scarcity, there is an increasing demand for rain water and industrial wastewater filtration and recycling using sustainable systems that do not rely on additional chemical treatment or extensive maintenance.

On the other hand, water can dissolve many different chemical compounds such as nitrates, pesticides, heavy metals, organic materials, and radioactive materials. Among these, heavy metals are considered to be the most dangerous pollutants for water. Heavy metals can stay in a water cycle for a long period of time. The presence of the heavy metals can interfere with biological processes and can cause dangerous diseases. Removal of heavy metals from water demands complex filtration devices and processes. Various approaches have been investigated to effectively remove heavy metals from a water source. However, these approaches generally rely on traditional power sources such as generators or an available power grid, and supply only a portion of the needs for water purification. Other systems that remove heavy metals from a water source and provide drinking water generally use traditional energy sources that produce greenhouse gases and other environmental pollutants. In addition, treatment units that rely on hydrocarbon based power generation increase the risk of contamination of the water source. Other solar powered units use combinations of filtration approaches that require the use of disposable filters and UV oxidation to provide disinfection and heavy metal removal. However, this type of approach is not well suited to developing economies as it requires significant maintenance work. Thus, there is a world-wide need for a sustainable and a portable water filtration system with low cost and low maintenance that can effectively remove pollutants (primarily heavy metals) from water, and without generating other environmental pollutants.

In view of the forgoing, one objective of the present invention is to provide a water filtration apparatus that include a nanoparticle layer, wherein each particle is a polypeptide-functionalized nanoparticle capable of absorbing heavy metals selected from the group consisting of $Pb^{2+}$, $As^{5+}$, $Cd^{2+}$, $Hg^{2+}$, $Cr^{6+}$, $Cu^{2+}$, and $Zn^{2+}$, as well as organic materials.

BRIEF SUMMARY OF THE INVENTION

According to a first aspect the present disclosure relates to a water filtration apparatus, including i) a hollow filter cartridge having a water inlet and a water outlet, ii) a zeolite layer located inside said cartridge in between the water inlet and the water outlet, which is configured to reduce a concentration of heavy metals in water, iii) a nanoparticle layer located in between the zeolite layer and the water outlet, which is configured to remove heavy metals and organic compounds in water, iv) an activated carbon layer located in between the zeolite layer and the nanoparticle layer, which is configured to reduce a concentration of organic compounds in water, wherein the nanoparticle layer comprises polypeptide-functionalized nanoparticles.

In one embodiment, the polypeptide-functionalized nanoparticles have a structure of formula (I):

(I)

wherein NP is a nanoparticle, L is a linker, and PP is a polypeptide.

In one embodiment, the linker comprises a heterocycle. In another embodiment, the linker comprises a carbocycle. In one embodiment, the linker comprises a triazole. In one embodiment, the linker is bound to the polypeptide via an amide bond.

In one embodiment, the nanoparticle is a silica nanoparticle. In another embodiment, the linker is bound to the silica nanoparticle via a Si—O—Si bond.

In one embodiment, the polypeptide is a block copolymer comprising at least two polymers selected from the group consisting of an alkyl-functionalized glutamine polymer, a phenylalanine polymer, and a carboxylic acid-functionalized glutamine polymer.

In one embodiment, the polypeptide is a diblock copolymer comprising the alkyl-functionalized glutamine polymer and the phenylalanine polymer or the carboxylic acid-functionalized glutamine polymer.

In one embodiment, the alkyl-functionalized glutamine polymer is an octadecyl-functionalized glutamine polymer.

In one embodiment, the polypeptide is a diblock copolymer comprising the phenylalanine polymer and the carboxylic acid-functionalized glutamine polymer.

In one embodiment, the polypeptide is a triblock copolymer comprising the alkyl-functionalized glutamine polymer, the phenylalanine polymer, and the carboxylic acid-functionalized glutamine polymer.

In one embodiment, the polypeptide-functionalized nanoparticles are spherical having a hydrodynamic radius in the range of 5-20 nm.

In one embodiment, the water filtration apparatus further includes a cotton filter pad located in between the water inlet and the zeolite layer, which is configured to remove suspended solids and sediments.

According to a second aspect the present disclosure relates to a method of removing $Pb^{2+}$, $As^{5+}$, $Cd^{2+}$, $Hg^{2+}$, $Cr^{6+}$, $Cu^{2+}$, and/or $Zn^{2+}$ from a water source with the water filtration apparatus. The method involves passing the water source through the zeolite layer, the activated carbon layer, and the nanoparticle layer of the water filtration apparatus.

According to a third aspect the present disclosure relates to a method of producing a polypeptide-functionalized nanoparticle having a structure of formula (I):

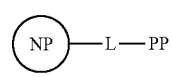

(I)

wherein NP is a nanoparticle, L is a linker comprising a triazole, and PP is a polypeptide including at least two polymers selected from the group consisting of an alkyl-functionalized glutamine polymer, a phenylalanine polymer, and a carboxylic acid-functionalized glutamine polymer. The method involves i) treating the polypeptide with an azide-containing reagent to form an azido polypeptide compound, ii) functionalizing a surface of the nanoparticle with an alkynyl reagent to form an alkynyl nanoparticle, iii) coupling the azido polypeptide compound to the alkynyl nanoparticle via an azide-alkyne cycloaddition to form the polypeptide-functionalized nanoparticle.

In one embodiment, the alkyl-functionalized glutamine polymer is present in the polypeptide and is an octadecyl-functionalized glutamine polymer.

In one embodiment, the nanoparticle is a silica nanoparticle. In another embodiment, the linker is bound to the silica nanoparticle via a Si—O—Si bond.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is a TEM (transmission electron microscopy) micrograph of the polypeptide-functionalized nanoparticles.

FIG. 3B is a magnified image of an individual polypeptide-functionalized nanoparticle. A core of the polypeptide-functionalized nanoparticle is shown as a black core.

FIG. 4A illustrates a water filtration apparatus.

FIG. 4B is a magnified image of a cotton filter pad of the water filtration apparatus.

FIG. 4C is a magnified image of a zeolite layer of the water filtration apparatus.

FIG. 4D is a magnified image of an activated carbon layer of the water filtration apparatus.

FIG. 4E is a magnified image of a nanoparticle layer of the water filtration apparatus.

DETAILED DESCRIPTION OF THE EMBODIMENTS

Figure 1:
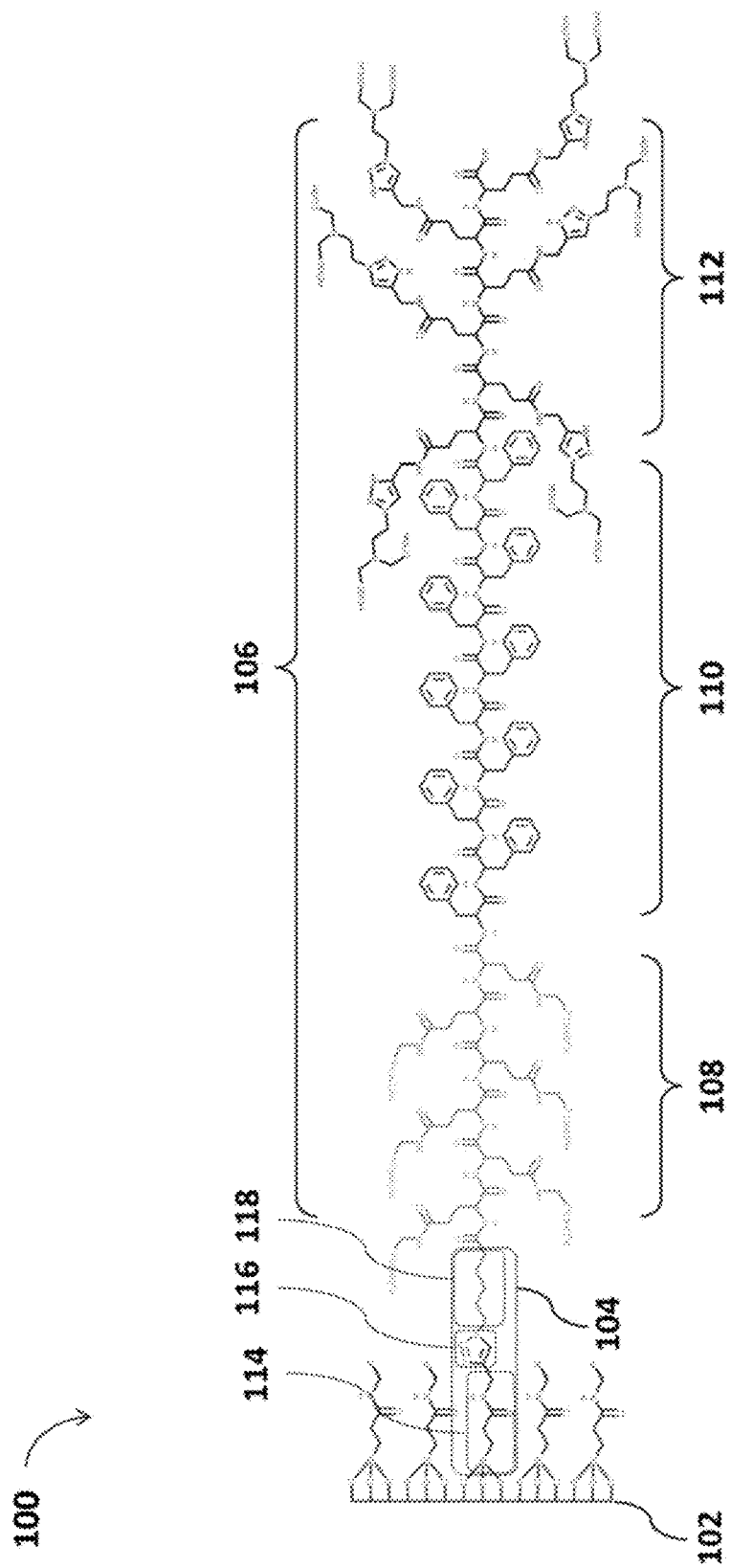
FIG. 1 represents an exemplary structure of a polypeptide-functionalized nanoparticle attached to a silica nanoparticle.

Referring now to the drawings, wherein like reference numerals designate identical or corresponding parts throughout the several views.

According to a first aspect the present disclosure relates to a water filtration apparatus 400 including a hollow filter cartridge 402 that includes a water inlet 412 and a water outlet 414 at opposite ends of said cartridge 402.

Figure 4F:
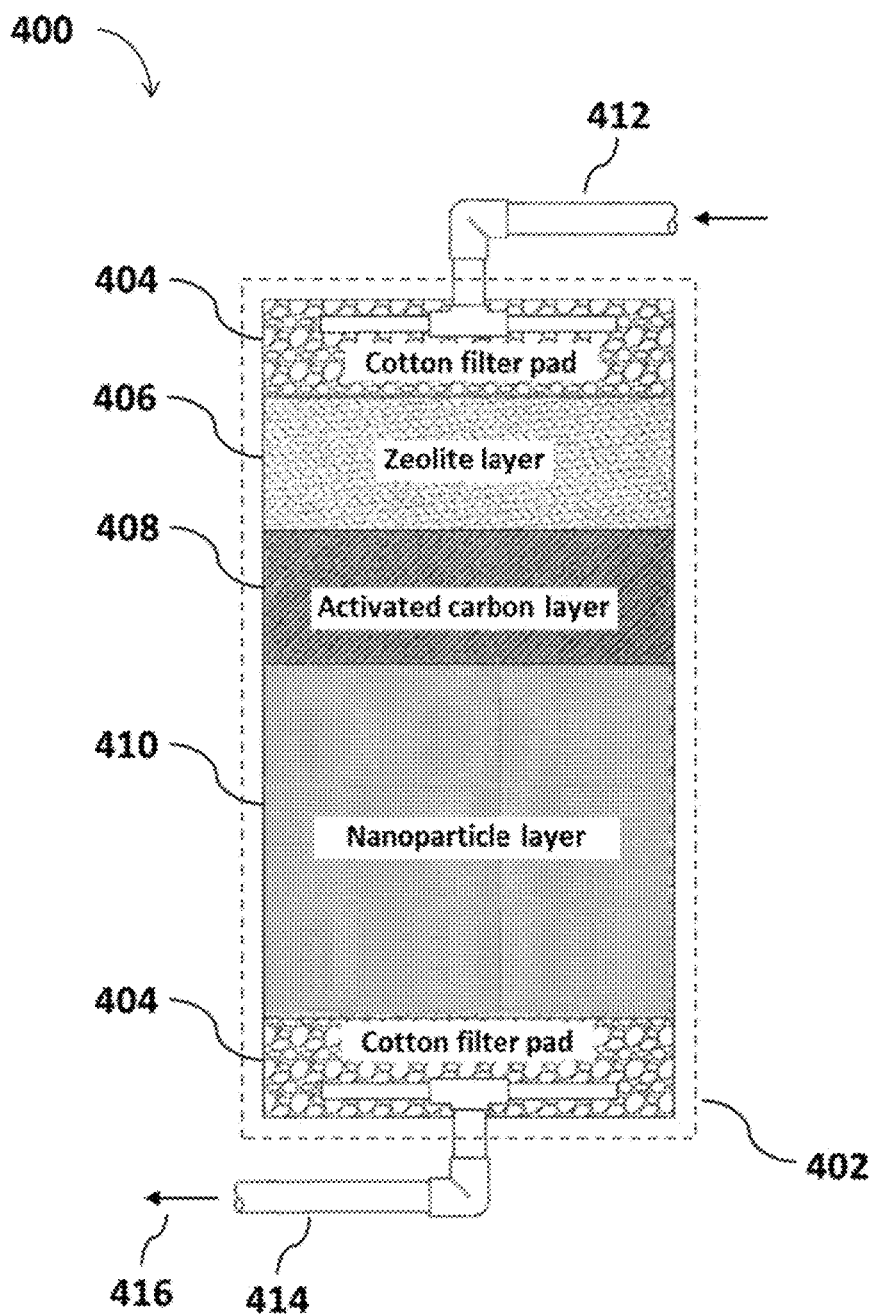
FIG. 4F is a representation of a vertically oriented water filtration apparatus.
Figure 4G:
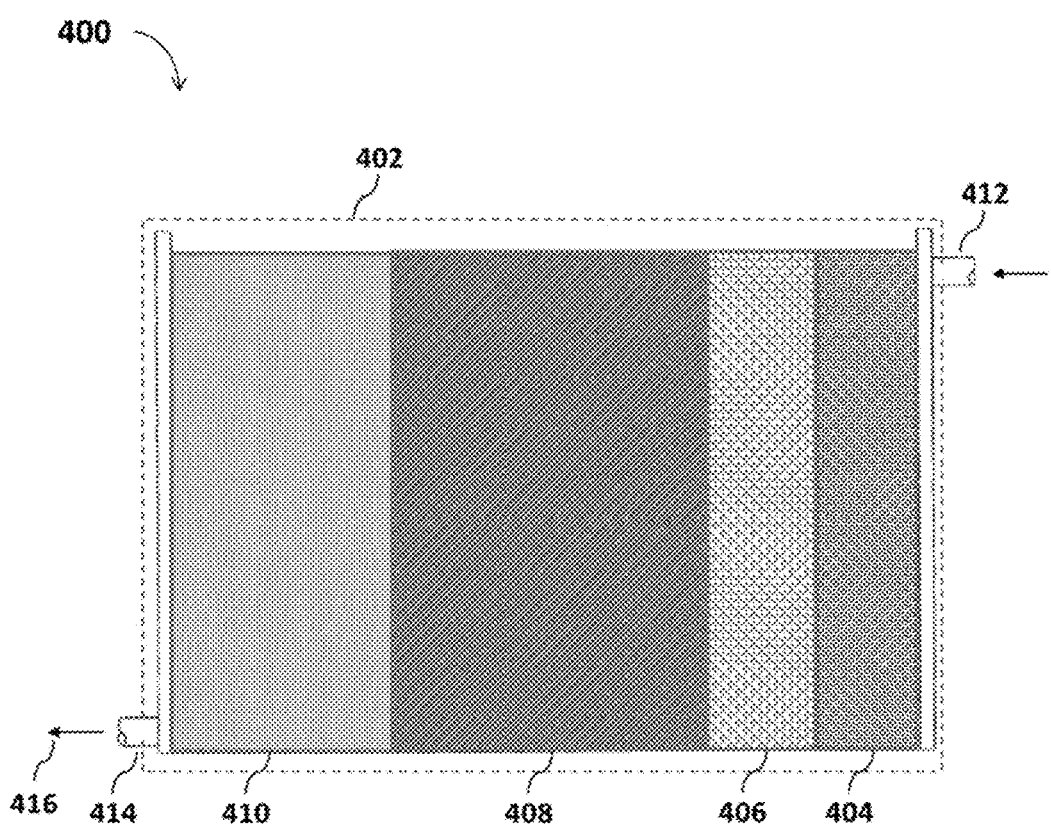
FIG. 4G is a representation of a horizontally oriented water filtration apparatus.

The hollow filter cartridge 402 is a container with an internal cavity that is configured to hold a liquid preferably at elevated pressures, for example, in a preferred embodiment, the cartridge 402 is configured to hold a liquid at a pressure in the range of 1-50 atm, preferably 1-20 atm, more preferably 10-20 atm. The cartridge 402 may be made of alumina, quartz, stainless steel, nickel steel, chromium steel, aluminum, aluminum alloy, copper and copper alloys, titanium, and the like, although the materials used to construct the cartridge are not meant to be limiting and various other materials may also be used. In one embodiment, a portion of an internal surface of the cartridge is coated with a polymeric lining to minimize internal surface oxidation of the cartridge. The polymeric lining may be epoxy or vinyl ester, or preferably a BPA-free polymer such as polyethylene, polypropylene, or polytetrafluoroethylene. In one embodiment, the cartridge 402 is cylindrical having an internal volume in the range of 0.1-10,000 L, preferably 5-5,000 L, or preferably 100-1,000 L, or preferably 500-1,000 L. In one embodiment, the cartridge 402 is rectangular having an internal volume in the range of 0.1-10,000 L, preferably 5-5,000 L, or preferably 100-1,000 L, or preferably 500-1,000 L. The cartridge 402 may also have other geometries including, but not limited to cubic, cylindrical, spherical, oblong, conical, and pyramidal. In a preferred embodiment, the hollow filter cartridge 402 is cylindrical and is vertically oriented (as shown in FIG. 4A and FIG. 4F). The hollow filter cartridge 402 may also be horizontally oriented (as shown in FIG. 4G). In another preferred embodiment, the hollow filter cartridge 402 is portable having an internal volume in the range of 0.1-10.0 L, preferably 0.5-8.0 L, more preferably 0.5-5.0 L.

In one embodiment, the cartridges having an internal volume of 500-1000 L or more are used to purify water for large scale purification demands (e.g. for a power plant, a chemical processing plant, a refining plant, or residential water consumption). On the other hand, in one embodiment, the cartridges having an internal volume of 0.5-5 L are used to purify water for small scale purification demands (e.g. a portable purifier that may fit into a backpack for purifying water in the field, or during traveling or hiking, etc.).

The water inlet 412 and the water outlet 414 are utilized as passages for loading and unloading the cartridge 402 with water. In one embodiment, the water inlet 412 and the water outlet 414 are substantially similar, wherein each is a cylindrical port having an internal diameter in the range of 1-50 mm, preferably 5-20 mm, more preferably 5-10 mm, even more preferably about 5 mm, which is configured to transfer water having a flow rate in the range of 0.1-1,000 L/min, preferably 10-500 L/min, or preferably 10-100 L/min. The water inlet 412 and the water outlet 414 may be secured with threaded fittings, or other means, to the cartridge 402.

In a preferred embodiment, the cartridge includes a water sprinkler located therein and proximal to the water inlet, wherein the water sprinkler divides a water stream into a plurality of water streams and distributes the plurality of water streams throughout a cross-section of the cartridge. The water sprinkler may be made of glass or metal, and can be used in any shape, preferably disc shape, cylindrical, or spherical. For example, in one embodiment, the water sprinkler has a perforated disc-shape structure. Size of perforations in the water sprinkler may be different ranging from 0.5-20 mm, preferably 1-5 mm, more preferably 2-4 mm. In-situ position and angular direction of the water sprinkler may be adjusted by a mechanical control system attached thereto. Additionally, the water sprinkler may also rotate around its shaft.

The water filtration apparatus 400 further includes a zeolite layer 406 located inside the hollow filter cartridge 402 in between the water inlet 412 and the water outlet 414.

Zeolite particles are alumino-silicate minerals that occur in nature. Elementary building units of zeolite particles are $SiO_4$ and $AlO_4$ tetrahedra. Adjacent tetrahedra are linked at their corners via a common oxygen atom, which results in an inorganic macromolecule with a three-dimensional framework. The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages.

The zeolite layer 406 refers to a crystalline structure of the zeolite particles that are deposited on a support material. In one embodiment, a silicon-to-aluminum molar ratio of zeolite particles in the zeolite layer 406 is at least 10, or preferably at least 20, or preferably at least 30, or preferably at least 40, or preferably at least 45, or preferably at least 50, but no more than 100. A higher silicon-to-aluminum molar ratio of zeolite particles provides a larger water flux and a reduced cation rejection rate of the zeolite layer. Conversely, a lower silicon-to-aluminum molar ratio of zeolite particles results in a lower water flux and an increased cation rejection rate of the zeolite layer. In another embodiment, the zeolite particles comprise micro-pores (i.e. pores having an average pore diameter of less than 2 nm) having a specific pore volume in the range of 0.1-0.3 $cm^3/g$, preferably 0.1-0.2 $cm^3/g$, more preferably 0.15-0.2 $cm^3/g$, and meso-pores (i.e. pores having an average pore diameters in the range of 2-50 nm) having a specific pore volume in the range of 0.01-0.15 $cm^3/g$, preferably 0.05-0.15 $cm^3/g$, more preferably 0.05-0.1 $cm^3/g$. In one embodiment, a specific pore volume of macro-pores (i.e. pores having an average pore diameter of above 50 nm) in the zeolite particles is less than 0.2 $cm^3/g$, preferably less than 0.1 $cm^3/g$, more preferably less than 0.01 $cm^3/g$. In one embodiment, a specific surface area of the micro-pores in the zeolite particles is in the range of 100-500 $m^2/g$, preferably 300-500 $m^2/g$, more preferably about 400 $m^2/g$, whereas a specific surface area of the meso-pores in the zeolite particles is in the range of 50-150 $m^2/g$, preferably 50-100 $m^2/g$, more preferably about 80 $m^2/g$. A specific surface area of the macro-pores in the zeolite particles may be in the range of 500-1,000 $m^2/g$, preferably 700-1,000 $m^2/g$, more preferably about 850 $m^2/g$. In another embodiment, an average pore diameter of the micro-pores, the meso-pores, and the macro-pores in the zeolite particles is in the range of 1-10 nm, preferably 2-6 nm, more preferably about 5 nm. In one embodiment, a total acidity of the zeolite particles in the zeolite layer 406 is in the range of 2-10 mmol/g, preferably 5-10 mmol/g, more preferably about 7.5 mmol/g. The zeolite layer 406 may be in the form of pellets having a diameter in the range of 0.5-5 mm, preferably 0.5-1.5 mm, more preferably about 1 mm. The zeolite layer 406 may also be extrudated to have a geometry selected from the group consisting of cylindrical, rectilinear, star-shaped, conical, pyramidal, rectangular, cubical, and ring-shaped.

The zeolite particles in the zeolite layer 406 may be one or more selected from the group consisting of a 4-membered ring zeolite, a 6-membered ring zeolite, a 10-membered ring zeolite, and a 12-membered ring zeolite. The zeolite particles in the zeolite layer may have a zeolite with a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite/ZSM-5 framework.

The zeolite layer 406 may contain pillared zeolites. A pillared zeolite is a type of zeolite, wherein pillars (e.g. silica pillars) are located between two adjacent layers in the zeolite.

The zeolite layer 406 may further include crystalline zeolite particles having a high cation exchange capacity and an ability to physically capture micron range particles from water. In one embodiment, the zeolite layer is able to remove particles having a size in the range of 0.5-20 μm, preferably 1-15 μm, more preferably 1-10 μm. The zeolite layer may also remove fluoride as well as limited reactive dechlorination of halogenated organics.

The zeolite particles can be manufactured using any technique that involves depositing the zeolite particles (having desired chemical compositions, pore sizes, and/or particle sizes) on a support material followed by performing a crystal growth reaction to produce the zeolite layer. For example, in one embodiment, a plurality of zeolite particles (or zeolite crystal seeds) are adhered to a support material (e.g. glass beads, etc.) and then treated in a halide solution (e.g. an ammonium halide solution) at a temperature in the range of 50-120° C., preferably 50-100° C., more preferably 80° C. for at least 18 hours, preferably at least 20 hours, more preferably at least 24 hours to help zeolite crystals to grow. Grown zeolite crystals may further be separated from the halide solution by centrifugation at a rotational speed of at least 2,000 rpm, preferably at least 3,000, more preferably at least 5,000 rpm. The grown zeolite crystals may further be calcined at a temperature in the range of 450-650° C., preferably 500-600° C., and dried. Additionally, the zeolite particles may also be manufactured via sol-gel processing techniques or hydrothermal synthesis methods.

In one embodiment, the zeolite layer 406 reduces a concentration of heavy metals in water. In a preferred embodiment, the heavy metals (which may be in cation form) are selected from the group consisting of $Pb^{2+}$, $As^{5+}$, $Cd^{2+}$, $Hg^{2+}$, $Cr^{6+}$, $Cu^{2+}$, and $Zn^{2+}$. Preferably, the concentration of heavy metals in water, after being treated with the zeolite layer 406, reduces down to less than 5000 ppm, preferably less than 2000 ppm, more preferably less than 1000 ppm. Furthermore, the zeolite layer may also reduce a concentration of cations of metals selected from the group consisting of Mn, Co, Ni, Se, Ag, Sb, and Tl.

In one embodiment, a selectivity of the zeolite layer 406 with respect to the heavy metals (i.e. $Pb^{2+}$, $As^{5+}$, $Cd^{2+}$, $Hg^{2+}$, $Cr^{6+}$, $Cu^{2+}$, and $Zn^{2+}$) over other dissolved metals, which may be present in water, is at least 85%, preferably at least 90%, more preferably at least 95%. Selectivity with respect a heavy metal (e.g. $Pb^{2+}$), as used herein, is a measure of the capability of a given zeolite layer to filter the heavy metal relative to other dissolved metals in water. For example, if selectivity of a zeolite layer with respect to $Pb^{2+}$ is at least 90%, then at least 90 wt % of Pb cations or Pb-containing compounds is removed from water relative to other dissolved metals, with the zeolite layer.

The water filtration apparatus 400 further includes a nanoparticle layer 410 located in between the zeolite layer 406 and the water outlet 414.

The nanoparticle layer 410 includes polypeptide-functionalized nanoparticles 100. In a preferred embodiment, the polypeptide-functionalized nanoparticles 100 have a structure of formula (I):

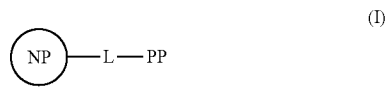

(I)

wherein NP is a nanoparticle 102, L is a linker 104, and PP is a polypeptide 106. In one embodiment, the polypeptide-functionalized nanoparticles 100 are spherical having a hydrodynamic radius in the range of 5-20 nm, preferably 5-15 nm, more preferably 5-10 nm.

The linker 104 may comprise a first component 114, whereby the linker 104 is bound to the nanoparticle 102, a third component 118, whereby the linker 104 is bound to the polypeptide 106, and a second component 116. The first and the third components are conjugated forming the second component.

In one embodiment, the first component 114 includes an amide. In a preferred embodiment, the nanoparticle 102 is a silica nanoparticle, and the first component 114 further includes Si, wherein the first component of the linker 104 is bound to the silica nanoparticle via a Si—O—Si bond, as shown in structure (II):

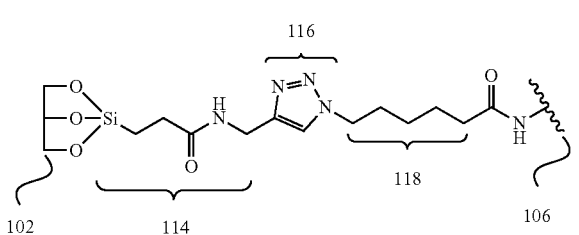

(II)

The nanoparticle 102 may be a ceramic nanoparticle, a metallic nanoparticle, a polyhedral oligomeric silsesquioxane, a nano-diamond, a carbon nanotube, a graphene sheet, or a fullerene. In one embodiment, the ceramic nanoparticle is one selected from the group consisting of silicon dioxide, titanium dioxide, zinc oxide, aluminum oxide, cadmium sulfide, zirconium oxide, calcium phosphate, calcium oxide, and a combination thereof.

In another embodiment, the third component 118 is linked to a terminal nitrogen of the polypeptide 106 though an amide linkage, as shown in structure (II).

In one embodiment, a carbocycle (i.e. the second component of the linker) may be formed as a result of a conjugation of the first and the third components. The carbocycle may be a cycloalkenyl compound as a result of a Diels-Alder reaction. The term "cycloalkenyl" is used herein to mean cyclic radicals, preferably of 6 to 8 carbons, which have at least two bonds. One example of cycloalkenyl compounds includes cyclohexenyl due to a Diels-Alder reaction. Other examples may include, but not limited to cyclopentenyl, cycloheptenyl, cyclooctenyl, and the like. Cycloalkenyl compounds are not aromatic. The carbocycle may also be a cycloalkyl including, but not limited to cyclohexyl, cycloheptyl, and cyclooctyl.

In another embodiment, a heterocycle may be formed as a result of the conjugation of the first and the third components. The term "heterocycle", as used herein, refers to a cyclic compound that has atoms of at least two different elements (i.e. heteroatom) as members of its ring. The heterocycle may include a 5-membered ring, a 6-membered ring, or a 7-membered ring. Heteroatoms of the heterocycle may preferably be oxygen, sulfur, and/or nitrogen, even though other elements such as boron, phosphorus, arsenic, antimony, bismuth, silicon, and/or tin may also be present in the ring structure of the heterocycle. The heterocycle may also be a bicyclic or a polycyclic compound.

In one embodiment, the heterocycle is a heteroaryl compound as a result of an alkyne and azide cycloaddition. The term "heteroaryl" as used herein refers to an aromatic cyclic compound that has atoms of at least two different elements (i.e. heteroatom) as members of its ring. Exemplary heteroaryl compounds include, but are not limited to imidazoles, pyrazoles, tetrazoles, pentazoles, oxatetrazoles, and thiatetrazoles. In a preferred embodiment, the heteroaryl compound is a triazole.

The heterocycle may be a heterocycloalkyl compound, which is an aliphatic cyclic compound that has atoms of at least two different elements (i.e. heteroatom) as members of its ring. The heteroatoms may occupy the positions at which the heterocycloalkyl compound is attached to the remainder of the linker (i.e. the first and the third components). Examples of heterocycloalkyl groups include, but are not limited to tetrahydropyridyl, piperidinyl, morpholinyl, tetrahydrofuran, tetrahydrothienyl, piperazinyl, and the like.

The term "polypeptide" refers to a polymer of amino acid residues, wherein the polymer may optionally be conjugated to a moiety that does not consist of amino acids. The term may apply to amino acid polymers in which one or more amino acid residues are an artificial chemical mimetic of a corresponding naturally occurring amino acid, as well as to naturally occurring amino acid polymers and non-naturally occurring amino acid polymers.

In one embodiment, the polypeptide 106 is a block copolymer having a repeating unit including a D-block and an E-block in a repeating sequence of $(D)_m\text{-}(E)_n$, wherein each of D and E is individually selected from the group consisting of an alkyl-functionalized glutamine polymer 108, a phenylalanine polymer 110, and a carboxylic acid-functionalized glutamine polymer 112, and wherein m and n are repeating numbers in the range of 2-100,000, preferably 1,000-5,000. In another embodiment, the block copolymer has a repeating unit in a repeating sequence of $[(D)_m\text{-}(E)_n]_r$, wherein each of D and E is individually selected from the group consisting of an alkyl-functionalized glutamine polymer 108, a phenylalanine polymer 110, and a carboxylic acid-functionalized glutamine polymer 112, wherein m and n are primary repeating numbers in the range of 2-100,000, preferably 1,000-5,000, and wherein r is a secondary repeating number in the range of 1-1,000, preferably 10-500.

In another embodiment, the polypeptide 106 is a block copolymer having a repeating unit including a D-block, an E-block, and an F-block in a repeating sequence of $[(D)_m\text{-}(E)_n\text{-}(F)_p]_r$, wherein each of D, E, and F is individually selected from the group consisting of an alkyl-functionalized glutamine polymer 108, a phenylalanine polymer 110, and a carboxylic acid-functionalized glutamine polymer 112, wherein m, n, and p are primary repeating numbers in the range of 2-100,000, preferably 1,000-5,000, and wherein r is a secondary repeating number in the range of 1-1,000, preferably 10-500.

The term "alkyl-functionalized glutamine polymer" as used herein refers to a polyglutamine (i.e. a sequence of several glutamines bonded together) backbone wherein the glutamine amide side chains are alkyl functionalized. The term "alkyl", as used herein, refers to a hydrocarbon fragment, preferably having 1 to 30, more preferably 5-25 carbons. Non-limiting examples of such hydrocarbon fragments include methyl, ethyl, propyl, isopropyl, butyl, isobutyl, t-butyl, pentyl, isopentyl, neopentyl, hexyl, isohexyl, methylpentyl, dimethylbutyl, vinyl, allyl, propenyl, butenyl, pentenyl, or hexenyl. The term "alkyl" may also refer to cyclic hydrocarbons. Exemplary cyclic hydrocarbon (i.e. cycloalkyl) include, but are not limited to cyclopropyl, cyclobutyl, cyclopentyl, cyclohexyl, norbornyl, and adamantyl. Branched cycloalkyl, such as exemplary 1-methylcyclopropyl and 2-methycyclopropyl groups, are also included in the definition of cycloalkyl as used in the present disclosure. In a preferred embodiment, the alkyl-functionalized glutamine polymer 108 is an octadecyl-functionalized glutamine polymer (i.e. the alkyl is a straight hydrocarbon fragment having 18 carbon atoms).

In addition, the term "carboxylic acid-functionalized glutamine polymer" as used herein refers to a polymer brush compound with a polyglutamine backbone and carboxy-terminus amino acids being the brushes for the backbone, wherein each carboxy-terminus amino acid includes at least one carboxylic acid, an amine, and a heteroaryl (as described previously). In one embodiment, the carboxy-terminus amino acid has a structure of formula (II):

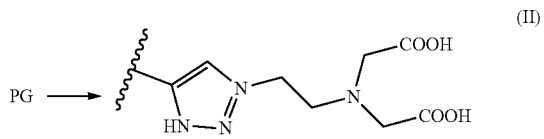

(II)

wherein PG is the polyglutamine.

In one embodiment, a selectivity of the nanoparticle layer 410 with respect to the heavy metals (i.e. $Pb^{2+}$, $As^{5+}$, $Cd^{2+}$, $Hg^{2+}$, $Cr^{6+}$, $Cu^{2+}$, and $Zn^{2+}$) over other dissolved metals, which may be present in water, is at least 95%, preferably at least 97%, more preferably at least 98%, even more prefer-ably at least 99%. Selectivity of a filtration layer has been defined previously. In addition, in another embodiment, a selectivity of the nanoparticle layer 410 with respect to the metals (in free form, in the cation form, or in an ionic salt form) selected from the group consisting of $Ba^{2+}$, $Sr^{2+}$, $Ca^{2+}$, $Mg^{2+}$, $Mn^{2+}$, $Fe^{2+}$, $Co^{2+}$, $Ni^{2+}$, $Pd^{2+}$, $Pt^{2+}$, Se, Ag, Sb, and Tl is at least 80%, preferably at least 90%, more preferably at least 95%.

In a preferred embodiment, an absorbance capacity per 1 gram of the nanoparticle layer 410 is at least 1000 mg $Pb^{2+}$, preferably at least 1200 mg $Pb^{2+}$, more preferably at least 1500 mg $Pb^{2+}$, but no more than 2500 mg $Pb^{2+}$; at least 150 mg $Cr^{6+}$, preferably at least 200 mg $Cr^{6+}$, more preferably at least 250 mg $Cr^{6+}$, but no more than 500 mg $Cr^{6+}$, at least 700 mg $Zn^{2+}$, preferably at least 800 mg $Zn^{2+}$, more preferably at least 900 mg $Zn^{2+}$, but no more than 1500 mg $Zn^2$; at least 200 mg $As^{5+}$, preferably at least 300 mg $As^{5+}$, more preferably at least 350 mg $As^{5+}$, but no more than 800 mg $As^{5+}$; at least 600 mg $Cd^{2+}$, preferably at least 700 mg $Cd^{2+}$, more preferably at least 800 mg $Cd^{2+}$, but no more than 1000 mg $Cd^{2+}$; at least 350 mg $Cu^{2+}$, preferably at least 450 mg $Cu^{2+}$, more preferably at least 550 mg $Cu^{2+}$, but no more than 1000 mg $Cu^{2+}$; at least 1000 mg $Hg^{2+}$, preferably at least 1300 mg $Hg^{2+}$, more preferably at least 1600 mg $Hg^{2+}$, but no more than 2500 mg $Hg^{2+}$.

The water filtration apparatus 400 further includes an activated carbon layer 408 located in between the zeolite layer 406 and the nanoparticle layer 410. The activated carbon layer 408 may be divided into a granular activated carbon layer and a powdered activated carbon layer. The granular activated carbon may have attributes, such as a pore volume of 0.5-1.0 $cm^3/g$, preferably 0.6-1.0 $cm^3/g$, more preferably 0.7-1.0 $cm^3/g$, even more preferably 0.8-1.0 $cm^3/g$; a specific surface area of 700 to 1500 $m^2/g$, preferably 1000 to 1500 $m^2/g$, more preferably 1200 to 1500 $m^2/g$; and an average pore diameter of 12-30 Å, preferably 12-20 Å, more preferably 12-15 Å. In one embodiment, the granular activated carbon layer allows for a continuous counter-current operation, thus resulting in a lowering in operation costs. In another embodiment, the granular activated carbon layer is recyclable. In another embodiment, the granular activated carbon layer does not undergo particle coagulation; therefore a chance of clogging is low. The granular activated carbon layer may also remove phenolic compounds, mercury-containing compounds, and/or organic solvents included in water. Further, the granular activated carbon layer may enhance the taste, smell, and turbidity of water by removing or reducing chlorine and/or parasites content. The powdered activated carbon layer may have attributes, such as a pore volume of 0.1-0.5 $cm^3/g$, preferably 0.3-0.5 $cm^3/g$, more preferably 0.4-0.5 $cm^3/g$; a specific surface area of 700 to 1500 $m^2/g$, preferably 1000 to 1500 $m^2/g$, more preferably 1200 to 1500 $m^2/g$; and an average pore diameter of 12-30 Å, preferably 15-30 Å, more preferably 20-30 Å. In one embodiment, the powdered activated carbon layer has a high adsorption speed.

In addition to the granular and powdered activated carbon, the activated carbon layer 408 may include another layer of charcoal particles for absorbing organic compounds, for example such as common volatile and semivolatile organic compounds, tannins, fluoride, arsenic, and metals that may be present in water. These organic compounds can adjust the taste, odor, color, and suitability of water for drinking.

The activated carbon layer 408 may further include activated carbon having a variety of capabilities to be appropriate for different purposes of water purification. For example, the activated carbon layer may have an iodine number of 900 to 2000 mg/g, preferably 1500 to 2000 mg/g; a pore volume of 0.3 to 0.8 cm$^3$/g, preferably 0.4 to 0.6 cm$^3$/g; a specific surface area (BET) of 1000 to 2000 m$^2$/g, preferably 1500 to 2000 m2/g; a micro-pore size of 12 to 20 Å, preferably 14 to 20 Å, and a meso-pore size of 30 to 40 Å, preferably 30 to 37 Å. The term "iodine number" of an activated carbon is a representative index of the specific surface area of the activated carbon.

In addition, the activated carbon layer 408 may include particles having one or more carboxy groups. Carboxy-functionalized particles may provide a metal adsorbing functionality to the activated carbon layer. "Particles with carboxy groups" as used herein may refer to carboxylic-acid functionalized particles that are dispersed within, without being covalently bonded to, the activated carbon layer 408. Examples include carboxyl-functionalized graphene oxide, or carboxyl-functionalized carbon nanotubes. Accordingly, the activated carbon layer 408 may include less than 1 vol %, preferably less than 0.5 vol % of carboxy-functionalized particles, with volume percent being relative to the total volume of the activated carbon layer.

In one embodiment, a selectivity of the activated carbon layer 408 with respect to the heavy metals (i.e. $Pb^{2+}$, $As^{5+}$, $Cd^{2+}$, $Hg^{2+}$, $Cr^{6+}$, $Cu^{2+}$, and $Zn^{2+}$) over other dissolved metals, which may be present in water, is at least 85%, preferably at least 90%, more preferably at least 95%.

In addition to the zeolite layer 406, the activated carbon layer 408, and the nanoparticle layer 410, the water filtration apparatus 400 further includes a cotton filter pad 404 located in between the water inlet 412 and the zeolite layer 406.

The cotton filter pad 404 may be at least one layer of a fabric, at least one layer of a cotton balls, or a combination thereof. Alternatively, the water filtration apparatus 400 may include a layer of sand, gravel, coarse silica, and/or ceramic particles having reactive coatings (e.g. calcium hypochloride) to remove suspended solids and sediments. In one embodiment, sands, gravels, coarse silica, and/or ceramic particles are dispersed in the cotton filter pad 404. A primary objective of the cotton filter pad 404 is to remove large particles, suspended solids, and sediments in water.

The water filtration apparatus 400, which includes at least the zeolite layer, the nanoparticle layer, and the activated carbon layer, is capable of absorbing heavy metals (in free form, in the cation form, or in an ionic salt form) selected from the group consisting of $Pb^{2+}$, $As^{5+}$, $Cd^{2+}$, $Hg^{2+}$, $Cr^{6+}$, $Cu^{2+}$, $Zn^{2+}$, $Ba^{2+}$, $Sr^{2+}$, $Ca^{2+}$, $Mg^{2+}$, $Mn^{2+}$, $Fe^{2+}$, $Co^{2+}$, $Ni^{2+}$, $Pd^{2+}$, $Pt^{2+}$, Se, Ag, Sb, and Tl. Accordingly, a concentration each of the heavy metals in water that exits the water outlet of the apparatus, per 1 cycle of filtration, is less than 500 ppm, preferably less than 200 ppm, more preferably less than 100 ppm, and even more preferably less than 50 ppm.

Although the preferred configuration of layers is to have the layers in the following order: the zeolite layer, the activated carbon layer, and the nanoparticle layer, in some embodiments, other configurations are possible and may depend on the type of water being filtered. For example, in one embodiment, the nanoparticle layer is disposed between the zeolite layer and the activated carbon layer. In another embodiment, two nanoparticle layers are used, wherein a first nanoparticle layer is disposed between the zeolite layer and the activated carbon layer, whereas a second nanoparticle layer is disposed between the activated carbon layer and the water outlet. The water preferably flows first through the zeolite layer but may alternately flow first through the activated carbon layer. It is preferable that the water not contact the nanoparticle layer until after first contacting the zeolite layer and the activated carbon layer, in any order. Water of sufficient purity with regard to dissolved organics may flow first through the nanoparticle layer then through the zeolite layer and the activated carbon layer in any order.

Various other embodiments of the water filtration apparatus 400 relates to layers for filtering fluoride-containing compounds and arsenic-containing compounds in water. For example, in one embodiment, a fluoride filter layer is employed to reduce a concentration of fluorine in water, which includes coarse gravels, zeolite particles, synthetic char, and activated aluminum. The synthetic char refers to a mixture of calcium phosphonate, calcium carbonate, and activated carbon. In another embodiment, the synthetic char is a mixture of about 80 wt % calcium phosphonate, about 10 wt % calcium carbonate, and about 10 wt % activated carbon, with weight percent being relative to the total weight of the mixture.

In one embodiment, the water filtration apparatus 400 further includes an arsenic absorbent layer that includes arsenic absorbent particles. The arsenic absorbent particles may be particles selected from the group consisting of iron oxide particles, diatomaceous earth particles, activated alumina particles, iron-enhanced activated alumina particles, aluminum oxide particles, manganese oxide particles, aluminum hydroxide particles, manganese hydroxide particles, iron hydroxide particles, zirconium hydroxide particles, zirconium oxide particles, and titanium dioxide particles. The arsenic absorbent layer may further include gravels, activated carbon particles, zeolite particles, Si fume, and/or the synthetic char (as described).

In another embodiment, the water filtration apparatus 400 further includes a layer having crushed andesite, basalt, zeolite, carbon, and shells to improve the taste of water. For example, in an embodiment, such a layer may be a mixture of crushed andesite and basalt, calcium carbonate, zeolite particles, and sands.

In one embodiment, each of the zeolite layer, the nanoparticle layer, and/or the activated carbon layer of the water filtration apparatus may be disposed on a removable tray or a removable grid, and therefore each layer can be removed from the water filtration apparatus.

According to a second aspect the present disclosure relates to a method of removing at least one heavy metal selected from the group consisting of $Pb^{2+}$, $As^{5+}$, $Cd^{2+}$, $Hg^{2+}$, $Cr^{6+}$, $Cu^{2+}$, and $Zn^{2+}$ from a water source via using the water filtration apparatus 400. The term "removing" as used herein refers to a condition, wherein a concentration of each of the heavy metals is reduced down to a threshold value. The threshold value refers to a safe concentration of a heavy metal in water for a specific purpose. For example, a safe arsenic concentration in drinking water is 10 ppb. Accordingly, removing arsenic from a water source means that a concentration of arsenic in the water source is reduced down to 10 ppb or less.

The method involves passing the water source through the zeolite layer 406, the activated carbon layer 408, and the nanoparticle layer 410 of the water filtration apparatus 400. Passing the water source through the zeolite layer, the activated carbon layer, and the nanoparticle layer in one pass in some instance may not reduce the concentration of the heavy metals to the threshold value; therefore, in a preferred embodiment, the method further involves collecting filtered water in a reservoir, and recycling at least a portion of the filtered water to the water filtration apparatus to get a more purified water. Depending on the threshold value, recycling may be performed only once or multiple times. For example, in one embodiment, the water source may be recycled at least three times, preferably at least four times, more preferably at least five times, to reduce an arsenic content of water to 10 ppb, preferably to 8 ppb to be applicable for drinking purposes.

The "water source" may refer to water, which has at least one heavy metal (in free form, in the cation form, or in an ionic salt form) selected from the group selected from the group consisting of $Pb^{2+}$, $As^{5+}$, $Cd^{2+}$, $Hg^{2+}$, $Cr^{6+}$, $Cu^{2+}$, $Zn^{2+}$, $Ba^{2+}$, $Sr^{2+}$, $Ca^{2+}$, $Mg^{2+}$, $Mn^+$, $Fe^{2+}$, $Co^{2+}$, $Ni^{2+}$, $Pd^{2+}$, $Pt^{2+}$, Se, Ag, Sb, and Tl. A concentration of the at least one heavy metal is in the range of 10 ppb to 5,000 ppm, preferably 100 ppb to 1000 ppm. The water sources may include, but are not limited to water present in oceans/seas, bays, lakes, rivers, creeks, as well as underground water resources. The water source may also be a wastewater stream.

Passing the water source through layers of the water filtration apparatus may refer to a process whereby water from the water source is brought into contact with layers of the apparatus, and preferably a pressure is applied to the water so as to force the water through the layers (i.e. the zeolite layer, the activated carbon layer, and the nanoparticle layer) to carry out a reverse osmosis. In the embodiment where the apparatus is vertically oriented, passing may not require an external pressure, and thus the required pressure that forces the water through the layers (i.e. the zeolite layer, the activated carbon layer, and the nanoparticle layer) is provided by gravity. However, in another embodiment, a pressure is applied to water. The pressure may be a positive pressure on an inlet side of the apparatus (i.e. a side proximal to the water inlet 412) or a negative pressure (i.e. a vacuum) on a permeate side of the apparatus (i.e. a side proximal to the water outlet). In one embodiment, the positive pressure applied to the water is in a range of 200 kPa to 20 MPa, preferably 1.0 MPa to 15 MPa, more preferably 2.0 MPa to 10 MPa. The positive pressure may be provided by a positive displacement pump, and the negative pressure may be produced by a vacuum pump to increase a water flux. By applying the pressure (i.e. the positive pressure and/or the negative pressure), water permeates through the zeolite layer, the activated carbon layer, the nanoparticle layer of the water filtration apparatus 400, and purified water 416 (i.e. permeate) is collected via the water outlet 414. In one embodiment, a valve coupled to the water outlet can be used to control a flow rate of the purified water.

Water flux typically has a linear relationship to a differential pressure across the layers of the apparatus. In one embodiment, the water flux is within the range of 1-10 $Kg/m^2$ per minute, preferably 2-5 $Kg/m^2$ per minute in the absence of the positive and/or the negative pressure. However, the water flux is within the range of 10-100 $Kg/m^2$ per minute, preferably 20-50 $Kg/m^2$ per minute, when a differential pressure in the range of 100-500 psi, preferably 200-500 psi is applied on both sides of the layers (i.e. the zeolite layer, the activated carbon layer, and the nanoparticle layer).

According to a third aspect the present disclosure relates to a method of producing a polypeptide-functionalized nanoparticle 100 having a structure of formula (I):

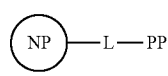

(I)

wherein NP is the nanoparticle 102 (as described), L is the linker 104 (as described) that includes a triazole, and PP is the polypeptide 106 (as described) that includes at least two polymers selected from the group consisting of the alkyl-functionalized glutamine polymer 108, the phenylalanine polymer 110, and the carboxylic acid-functionalized glutamine polymer 112.

The polypeptide 106 is first produced by solid phase peptide synthesis, which is known to the people skilled in the art. For example, in one embodiment, the peptides are synthesized using an Fmoc-Gly-2-chlorotrityl resin. Accordingly, a specified amount, i.e., less than 5 gr, preferably less than 1 gr, of the Fmoc-Gly-2-chlorotrityl resin is swollen in a solution of DMF and dichloromethane (the solution preferably has a 1:1 molar ratio of DMF to dichloromethane) for at least 10 minutes, but no more than 20 minutes. Subsequently, at least five equivalents of n-[(9H-fluoren-9-ylmethoxy)carbonyl]-1-alanyl-1-alanine (Fmoc-AA-OH) and at least five equivalents of N,N,N',N'-tetramethyl-O-(1H-benzotriazol-1-yl)uronium hexafluorophosphate (HBTU) are dissolved in the solution, and further, at least five equivalents, preferably at least six equivalents of N,N-diisopropylethylamine are also added to the solution. The solution is stirred for at least 30 minutes, preferably at least 45 minutes to form the peptides. In one embodiment, the peptides are split from the Fmoc-Gly-2-chlorotrityl resin. Accordingly, the Fmoc-Gly-2-chlorotrityl resin may be treated with a trifluoroacetic acid dissolved in $CH_2Cl_2$ (having an acid concentration of 3%, preferably 5%) for half an hour, preferably one hour, to split the peptides from the Fmoc-Gly-2-chlorotrityl resin. After that, said resin may be removed via filtration and the peptides may be separated by an organic solvent (e.g. ethanol), followed by a separation and a purification process.

The method involves treating the polypeptide (e.g. the N-terminus) with an azide-containing reagent to form an azido polypeptide compound. In one embodiment, the azide-containing reagent is an acyl azide. In one embodiment, the azide-containing reagent is an azido-alkanoyl halide. In an alternative embodiment, the azide-containing reagent is an azido-alkanoyl chloride. The term "alkanoyl", as used herein, refers to an alkyl group, preferably having 2 to 18 carbon atoms, that is bound with a double bond to an oxygen atom. Examples of alkanoyl include acetyl, propionyl, butyryl, isobutyryl, pivaloyl, valeryl, hexanoyl, octanoyl, lauroyl, stearoyl. In a preferred embodiment, the azide-containing reagent is 6-azidohexanoyl chloride.

The azido polypeptide compound is a polypeptide compound (as described) which is functionalized with an azide. Azide refers to a linear anion with the formula $N_3^-$, which is a conjugate base of hydrazoic acid ($HN_3$).

In one embodiment, treating the polypeptide with the azide-containing reagent may be performed at a temperature in the range of 20-60° C., preferably 20-40° C., and under atmospheric pressure. Furthermore, the polypeptide may be treated in the azide-containing reagent under an inert atmosphere (e.g. in the presence of nitrogen, argon, and/or helium).

The method further involves functionalizing a surface of the nanoparticle 102 (as described previously) with an alkynyl reagent (e.g. propargylamine) to form an alkynyl nanoparticle. The alkynyl reagent (or an alkyne reagent) refers to an unsaturated hydrocarbon compound that includes at least one carbon-carbon triple bond in its structure. In one embodiment, the nanoparticle 102 is a silica nanoparticle, and the alkynyl reagent, which includes a Si, is bound to the silica nanoparticle via a Si—O—Si bond. For example, the alkynyl reagent has a halosilane terminus or a alkoxysilane terminus which can be used to bond to the silica nanoparticle. The alkynyl reagent may further include an amide. Functionalizing the nanoparticles with an alkynyl reagent may be carried out as follows: a predetermined amount of silica nanoparticles is mixed in anhydrous solvent (e.g. toluene and/or DMF) under an inert atmosphere, and the resulting mixture is sonicated for at least 30 min, preferably at least 1 hour. The mixture of the silica nanoparticles in anhydrous solvent is then placed in an oil bath preset at a temperature in the range of 70-120° C., preferably 80-100° C. The alkynyl reagent (e.g. propargylamine) is added to the mixture and stirred for at least 3 hours, preferably at least 6 hours. Next, the mixture is maintained at a temperature in the range of 70-120° C., preferably 80-100° C., for at least 18 hours, preferably at least 20 hours, more preferably at least 24 hours, wherein the alkynyl nanoparticles are formed thereafter. The alkynyl nanoparticles may be separated from the solution by centrifugation under a rotational speed of at least 1000 rpm, preferably 3000 rpm, for at least 30 min, preferably at least 1 hour.

The method further involves coupling the azido polypeptide compound to the alkynyl nanoparticle via an azide-alkyne cycloaddition to form the polypeptide-functionalized nanoparticle 100. The azide-alkyne cycloaddition refers to a cycloaddition reaction of an azide and a terminal or internal alkyne to give a triazole. The azide-alkyne cycloaddition may also be known as "click chemistry" to those skilled in the art. The azide-alkyne cycloaddition may be carried out at a temperature in the range of 0-120° C., preferably 20-100° C., more preferably about 90° C. The azide-alkyne cycloaddition may be carried out at a pH range over 4 to 12. The cycloaddition may be performed in the presence of a catalyst or in the absence of the catalyst, and the catalyst may preferably be a Ru-containing or a Cu-containing catalyst. For example, in one embodiment, the alkynyl nanoparticle is suspended in a suspension solution comprising an organic solvent (e.g. DMF), diisopropylethylamine, copper iodide, and sodium ascorbate, and then the azido polypeptide compound is slowly added to the suspension solution. The suspension solution may be stirred with a stirrer at room temperature for at least 8 hours, preferably at least 10 hours. Next, the nanoparticles are filtered and washed with an imidazole solution, DMF, water, methanol, piperidine, and/or dichloromethane for at least 3 times, preferably at least 5 times. Finally, the nanoparticles may be dried under vacuum.

The examples below are intended to further illustrate protocols for producing the polypeptide-functionalized nanoparticles to be used in the nanoparticle layer of the water filtration apparatus, and are not intended to limit the scope of the claims.

Example 1—Nanoparticle Design & Synthesis

The nanoparticle preparation was based on four main components. The first part (as shown in FIG. 1, No. 112) is responsible to chelate all types of heavy metals. The design is based on poly-carboxylate which have high tendency to coordinate around the metal from four places to form a tetra-dente system. The second part is a poly-aromatic (as shown in FIG. 1, No. 110). This part of the molecule has good performance to react with aromatic compounds including aromatic pesticides by forming π-π interaction. The third part is a poly-hydrocarbon (as shown in FIG. 1, No. 108) that provides a high tendency to form dipole-dipole interactions with aliphatic hydrocarbons and oily materials.

These nanoparticles precursors were prepared by solid phase peptide synthesis. The poly-carboxylate [Mohan, D., Pittman, C. U., JR. 2007, Arsenic removal from water/wastewater using adsorbents—A review, *Journal of Hazardous Materials*, 142, 1-53] was linked to the glutamine by click chemistry, then the sequence was elongated by phenylalanine coupling, then glutamine modified by octadecyl group in the side chain was coupled. After which, the N-terminus is capped by 6-azidohexanoyl chloride. The small peptide was ready to be coupled to surface-modified silica. The coupling of this polymer with the silica was performed using click chemistry to form a peptide-functionalized silica. The structure of the peptide-functionalized silica is shown in FIG. 1.

Example 2—Nanoparticle & Peptide Characterization

Figure 2A:
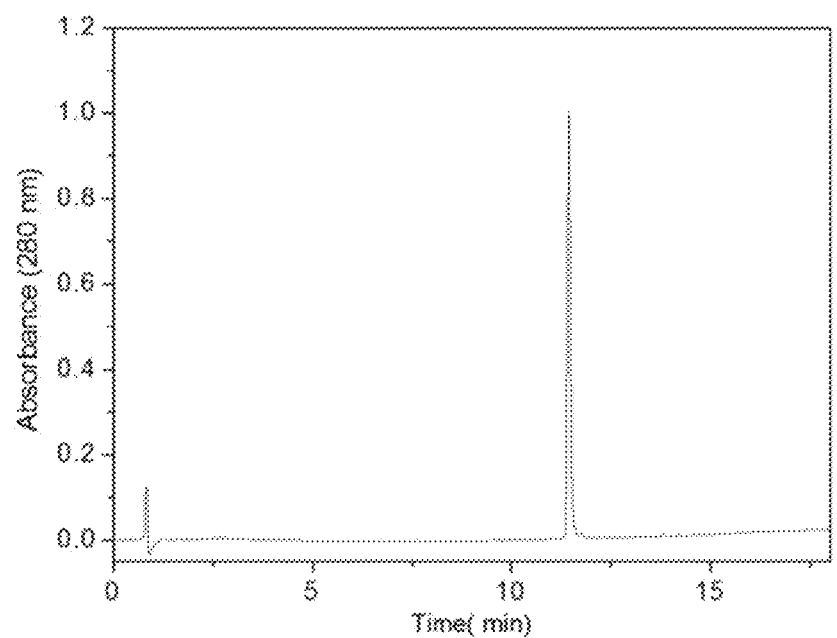
FIG. 2A represents an HPLC chromatogram of the polypeptide-functionalized nanoparticle.
Figure 2B:
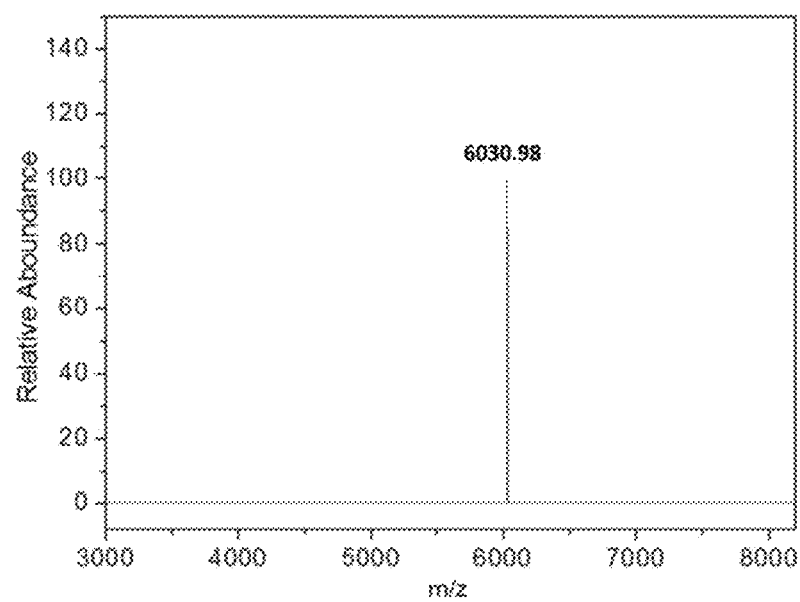
FIG. 2B represents a mass spectrum of the polypeptide-functionalized nanoparticle.

The peptide was characterized before the coupling with silica via using HPLC. The HPLC chromatogram revealed a high purity of the peptide (as shown in FIG. 2A). In addition, a mass spectrum of the peptide depicted the estimated molecular weight of purified peptide before being coupled to the silica nanoparticle (as shown in FIG. 2B). RP-UPLC analysis of peptide was analyzed using restic C18 column (2.1 mm×100 mm, 2.1 μm) with a linear gradient of 10-90% B over 20 min produce a single peak with retention time 11.75 min (solvent A was water/0.1% TFA and solvent B was acetonitrile/0.1% TFA), $C_{318}H_{395}N_{61}O_{60}$+calc [M+H]+ =6027.9732, observed [M+H]+=6027.9697.

Example 3—Electronic Microscopy Analysis

The EM image analysis of the sample of modified silica (when diluted in ethanol) demonstrated the presence of spherical nanoparticles. The EM images indicated spherical nanoparticles of 15-20 nm in diameter. Black spots in the center of the spherical nanoparticles indicated the silica nanoparticles, while the external side presented the peptide.

Example 4—Filter Design

The filter design is based on a layer of cotton to protect other layers and to filter dissolved and suspended solids and sediments. The second layer was packaged by zeolite is configured to remove and/or to decrease the concentration of heavy metals [Bailey, S. E., Olin, T. J., Bricka, R. M. & Adrian, D. D. 1999, A review of potentially low-cost sorbents for heavy metals, *Water Research*, 33, 2469-2479]. The third layer includes activated carbon to remove organic and coloring materials [Mohan, D., Pittman, C. U., Jr. 2007, Arsenic removal from water/wastewater using adsorbents—A review, *Journal of Hazardous Materials*, 142, 1-53; Mohan, D., Pittman, C. U., Jr. 2006, Activated carbons and low cost adsorbents for remediation of tri- and hexavalent chromium from water, *Journal of Hazardous Materials*, 137, 762-811]. Finally, the fourth layer (i.e. the nanoparticle layer) is responsible to chelate all types of heavy metals, organic materials, and oily materials [Wang, J., Zheng, S. Shao, Y., Liu, J., Xu, Z. & Zhu, D. 2010, Amino-functionalized $Fe_3O_4$ at $SiO_2$ core-shell magnetic nanomaterial as a novel adsorbent for aqueous heavy metals removal, *Journal of Colloid and Interface Science*, 349, 293-299; Zhou, D., Li, Y., Hall, E. A. H., Abell, C. & Klenerman, D. 2011, A chelating dendritic ligand capped quantum dot: preparation, surface passivation, bioconjugation and specific DNA detection, *Nanoscale*, 3, 201-211]. The assembly as described prevents any leaching through the aforementioned layers. Thence, the water fraction will be collected after passing wastewater through layers as analyzed by ICP.

Example 5

Figure 5:
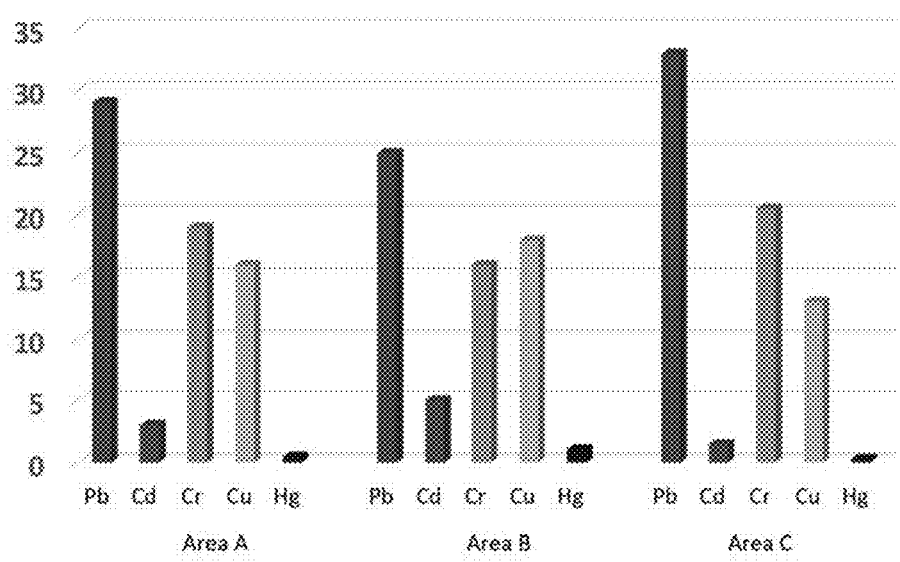
FIG. 5 represents heavy metal contents of three water samples from three distinct areas.

Water samples were collected from different locations within 10 km from the industrial area. Water samples were quantified by ICP-MS. Average heavy metal concentration prior to any filtration or other treatments is as shown in FIG. 5.

The Industrial water was then passed through the column packaged by 3 layers of zeolite (10 g), activated carbon (10 g) and nanoparticles based on silica (10 g). Water fractions were then collected and samples were quantified by ICP-MS. No heavy metals were observed by ICP-MS after passing more than 50 L of industrial water. This showed high capacity of designed column to adsorb heavy metals.

TABLE 1

| Absorbance capacity of nanoparticles based on silica gel for heavy metals (mg/g) | | | | | | |
|---|---|---|---|---|---|---|
| $Pb^{2+}$ | $Cr^{6+}$ | $Zn^{2+}$ | $As^{5+}$ | $Cd^{2+}$ | $Cu^{2+}$ | $Hg^{2+}$ |
| 1450 | 235 | 905 | 360 | 875 | 530 | 1675 |

The Nanoparticles based on silica gel show very promising absorbance to remove heavy metals and many other organic compounds such as: pesticides, oily materials and waste come from detergents.

The invention claimed is:

1. A water filtration apparatus, comprising:
a hollow filter cartridge having a water inlet and a water outlet;
a zeolite layer located inside said cartridge between the water inlet and the water outlet, which is configured to reduce a concentration of heavy metals in water;
a nanoparticle layer located between the zeolite layer and the water outlet, which is configured to remove heavy metals and organic compounds in water; and
an activated carbon layer located between the zeolite layer and the nanoparticle layer, which is configured to reduce a concentration of organic compounds in water, wherein the nanoparticle layer comprises polypeptide-functionalized nanoparticles.

2. The water filtration apparatus of claim 1, wherein the polypeptide-functionalized nanoparticles have a structure of formula (I):

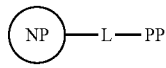

(I)

wherein NP is a nanoparticle,
L is a linker, and
PP is a polypeptide.

3. The water filtration apparatus of claim 2, wherein the linker comprises a heterocycle.

4. The water filtration apparatus of claim 2, wherein the linker comprises a triazole.

5. The water filtration apparatus of claim 2, wherein the linker comprises a carbocycle.

6. The water filtration apparatus of claim 2, wherein the linker is bound to the polypeptide via an amide bond.

7. The water filtration apparatus of claim 2, wherein the nanoparticle is a silica nanoparticle.

8. The water filtration apparatus of claim 7, wherein the linker is bound to the silica nanoparticle via a Si—O—Si bond.

9. The water filtration apparatus of claim 2, wherein the polypeptide is a block copolymer comprising at least two polymers selected from the group consisting of an alkyl-functionalized glutamine polymer, a phenylalanine polymer, and a carboxylic acid-functionalized glutamine polymer.

10. The water filtration apparatus of claim 9, wherein the polypeptide is a diblock copolymer comprising the alkyl-functionalized glutamine polymer and the phenylalanine polymer or the carboxylic acid-functionalized glutamine polymer.

11. The water filtration apparatus of claim 10, wherein the alkyl-functionalized glutamine polymer is an octadecyl-functionalized glutamine polymer.

12. The water filtration apparatus of claim 9, wherein the polypeptide is a diblock copolymer comprising the phenylalanine polymer and the carboxylic acid-functionalized glutamine polymer.

13. The water filtration apparatus of claim 9, wherein the polypeptide is a triblock copolymer comprising the alkyl-functionalized glutamine polymer, the phenylalanine polymer, and the carboxylic acid-functionalized glutamine polymer.

14. The water filtration apparatus of claim 1, wherein the polypeptide-functionalized nanoparticles are spherical having a hydrodynamic radius in the range of 5-20 nm.

15. The water filtration apparatus of claim 1, further comprising:
a cotton filter pad located in between the water inlet and the zeolite layer, which is configured to remove suspended solids and sediments.

16. A method of removing $Pb^{2+}$, $As^{5+}$, $Cd^{2+}$, $Hg^{2+}$, $Cr^{6+}$, $Cu^{2+}$, and/or $Zn^{2+}$ from a water source with the water filtration apparatus of claim 1, comprising:
passing the water source through the zeolite layer, the activated carbon layer, and the nanoparticle layer.

17. A method of producing a polypeptide-functionalized nanoparticle having a structure of formula (I):

(I)

wherein NP is a nanoparticle,
L is a linker comprising a triazole, and
PP is a polypeptide comprising at least two polymers selected from the group consisting of an alkyl-functionalized glutamine polymer, a phenylalanine polymer, and a carboxylic acid-functionalized glutamine polymer,
the method comprising:
treating the polypeptide with an azide-containing reagent to form an azido polypeptide compound;
functionalizing a surface of the nanoparticle with an alkynyl reagent to form an alkynyl nanoparticle; and
coupling the azido polypeptide compound to the alkynyl nanoparticle via an azide-alkyne cycloaddition to form the polypeptide-functionalized nanoparticle.

18. The method of claim 17, wherein the alkyl-functionalized glutamine polymer is present in the polypeptide and is an octadecyl-functionalized glutamine polymer.

19. The method of claim 17, wherein the nanoparticle is a silica nanoparticle.

20. The method of claim 19, wherein the linker is bound to the silica nanoparticle via a Si—O—Si bond.

* * * * *